July 3, 1962
I. L. GARNAND
3,041,750
EXCAVATOR MECHANISM FOR ATTACHMENT TO A TRACTOR
Filed Aug. 28, 1959
2 Sheets-Sheet 1
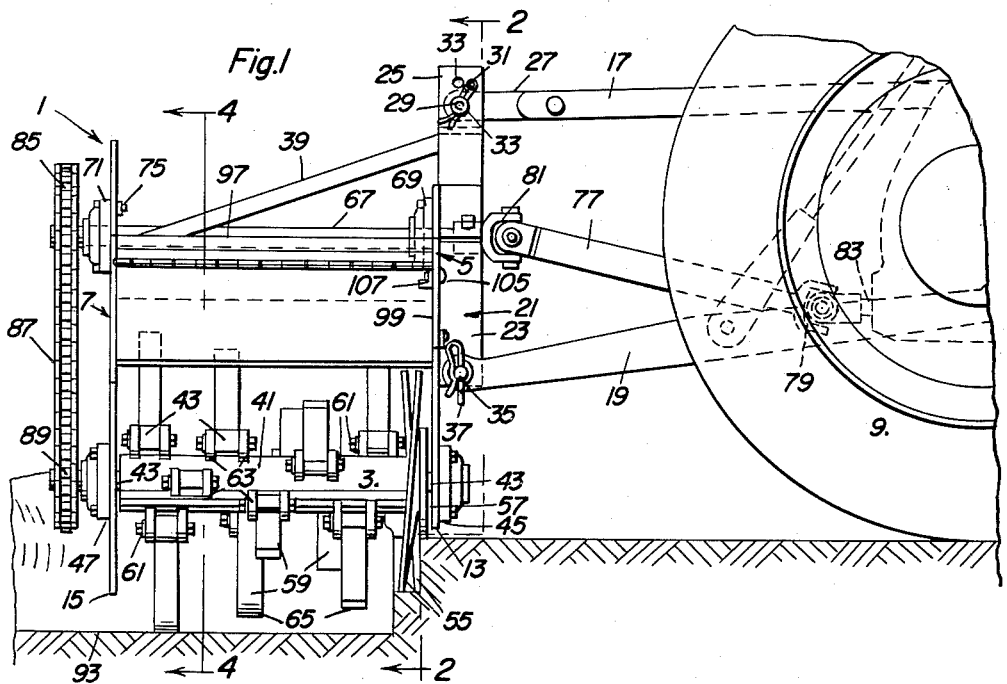
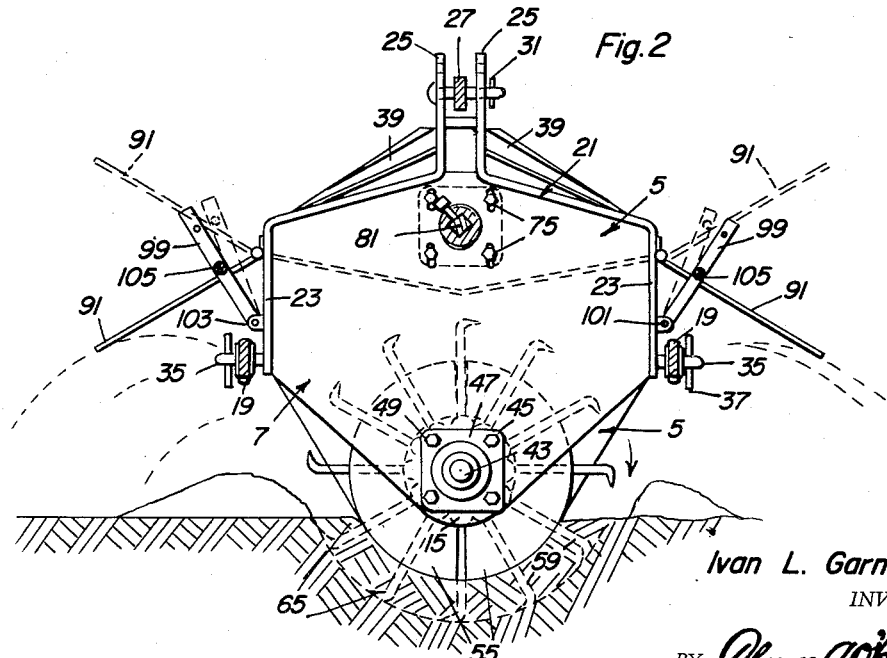
Ivan L. Garnand
INVENTOR.

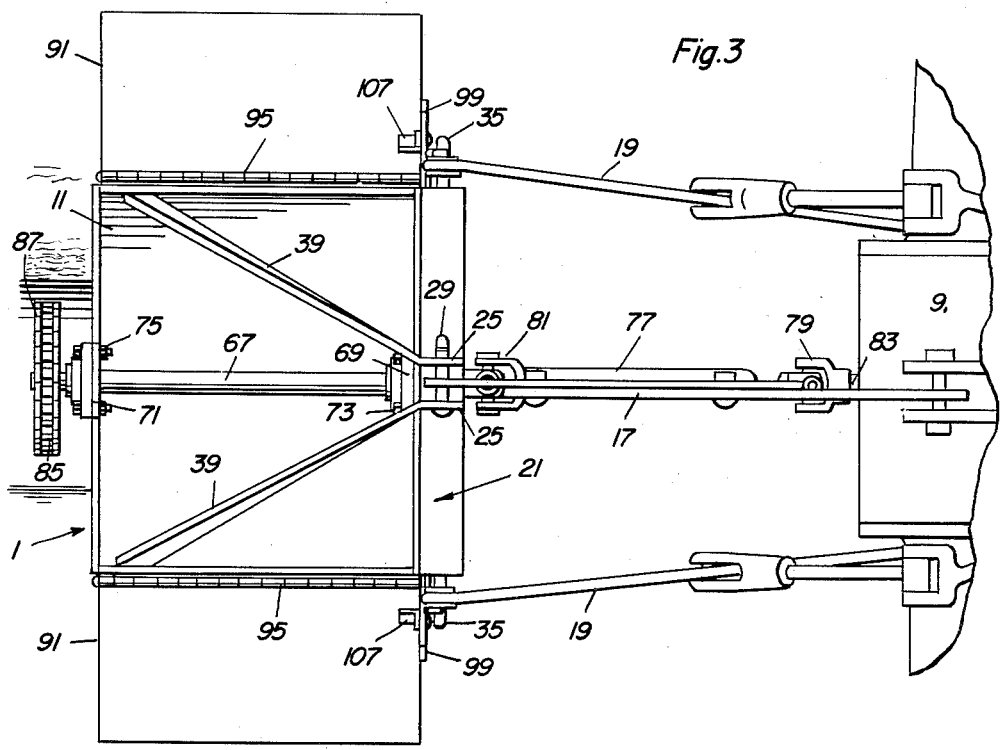
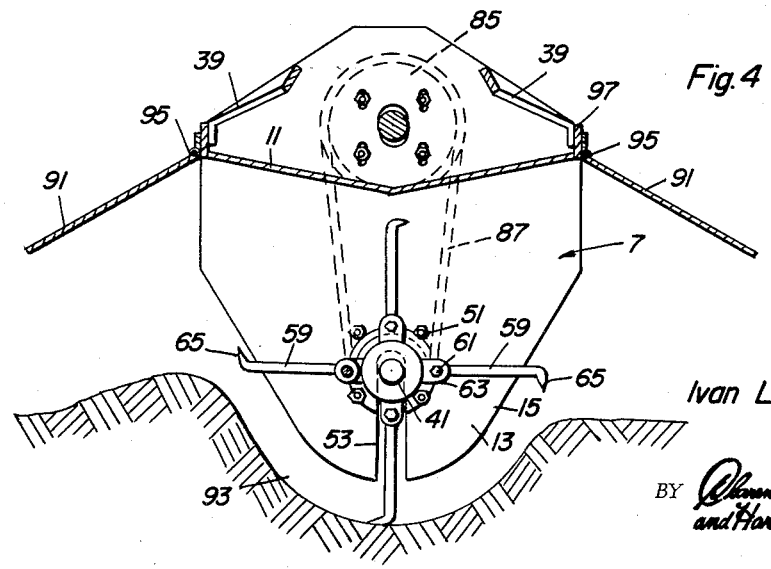
Ivan L. Garnand
INVENTOR.

United States Patent Office 3,041,750
Patented July 3, 1962

3,041,750
EXCAVATOR MECHANISM FOR ATTACHMENT TO A TRACTOR
Ivan L. Garnand, Rte. 3, Twin Falls, Idaho
Filed Aug. 28, 1959, Ser. No. 836,798
9 Claims. (Cl. 37—92)

This invention relates to improvements in rotary excavator mechanisms for attachment to a tractor to dig new ditches or clean out old ditches that have become clogged with debris.

The primary object of the invention is to provide mechanism for the above purposes adapted for attachment to the power lift of a tractor for raising and lowering into and from digging position and which embodies a rotary digger reel adapted to be operatively connected to the power take-off of the tractor and which involves both earth cutting and earth digging and shoveling devices, respectively, for ditching and clean-out purposes.

Another object is to provide mechanism according to the foregoing including deflector means for baffling earth, or debris, thrown upwardly out of a ditch by the digger reel so that such earth, or debris, will fall along opposite sides of a ditch being dug or cleaned out and will not be scattered broadcast upwardly and laterally of a ditch.

Still another object is to provide a mechanism in accordance with the foregoing which is comparatively simple in construction, easy to attach and detach, and in which the digger reel is well adapted for high speed operation in hard or soft earth to dig and/or clean out round bottom ditches such as are used especially for irrigation purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary view in side elevation of the improved rotary excavator mechanism of this invention attached to the power lift and rear power take-off of a tractor;

FIGURE 2 is a view in vertical cross-section taken on the line 2—2 of FIGURE 1;

FIGURE 3 is a fragmentary view in plan, and

FIGURE 4 is a view in vertical cross-section taken on the line 4—4 of FIGURE 1.

Referring to the drawings by numerals, the excavator mechanism of this invention comprises, as its main components, an open sided digger reel housing designated generally by the numeral 1, and a digger reel designated generally by the numeral 3.

The housing 1 comprises upright front and rear metal plates 5, 7 transverse thereto and to the line of travel of a tractor and which are spaced apart by a concave top metal plate 11 suitably attached thereto, both the front and rear plates 5, 7 having downwardly tapering lower ends 13, 15 respectively.

The housing 1 is provided with means for attaching the same to the upper control arm 17 and the side power lift arms 19 of a tractor 9 comprising the following. An angulated, upright bar metal yoke 21 of substantially inverted U-shape is suitably attached to the front face of the front plate 5 with a pair of side arms 23 depending for a short distance alongside the side edges of said plate 5, and a pair of upright laterally spaced upper arms 25 in the longitudinal center of the housing.

The upper arms 25 of the yoke 21 straddle a terminal pivotally mounted link 27 on the control arm 17. A pivot bolt 29 with a retaining cotter pin 31 therein is selectively insertable through vertically spaced apertures 33 in said upper arms 25 to vertically adjustably pivot said yoke 21 to said control arm 17. Lateral studs 35 on the lower ends of the side arms 23, with retaining cotter pins 37 therein and which extends through the rear ends of the side power lift arms 19 pivotally mount the housing on said arms 19 for levelling or tilting of said housing, and the reel 3 by vertically adjusting the pivot bolt 29 whereby to level the digger reel 3 longitudinally as may be required. Diagonal brace bars 39 extend from the upper arms 25 of the yoke 21 to the rear corners of the top plate 11.

The digger reel 3 comprises a cylinder 41 extending longitudinally in the bottom of the housing 1 in the longitudinal center of said housing 1 and which rotatably fits between the lower ends 13, 15 of the front and rear plates 5, 7 with reduced ends 43 journalled in front and rear bearings 45, 47 bolted, as at 49, 51, to said plates 5, 7. A vertical slot 53 is provided in the lower end 13 of the rear plate 7 to facilitate bolting the rear bearing 47 in place with the adjacent reduced end of the cylinder 41 journalled in the said bearing.

A pair of diametrically opposite, semi-circular earth cutter blades 55 at the front end of the cylinder 41 are suitably fixed to a circumferential flange 57 on said cylinder 41 and are oppositely pitched, relatively, at a slight angle and extend below the bottom of the housing 1 to cut into earth in ditch digging operations and to similarly function in ditch clean-out operations.

A plurality of shovel bars 59 are carried by the cylinder 41 behind the blades 55 with inner ends 43 pivoted, as at 61, between pairs of radial lugs 63 on the cylinder 41 and with front ends 65 curved, all in the same direction, to act as digging shovels in one direction of rotation of the cylinder 41, which is to say the cutter reel 3. The shovel bars 59 are arranged in longitudinal rows on the cylinder 41 with the shovel bars 59 in each row staggered relative to those in the other rows and because of the pivotal mounting of said shovel bars, and in response to centrifugal throw, said shovel bars 59 strike and dig into the earth, or debris, behind the blades 55 with a flailing action, in one direction of rotation of the reel 3, whereby to dig or clean-out a ditch in response to forward travel of the tractor 9. As will be clear, the shovel bars 59 tend to throw dug up earth, or debris outwardly and upwardly at the sides of the ditch, and the housing 1. Of course some of the dug up earth or debris will be carried around over the reel 3 by the shovel bars 59 and then thrown outwardly of one side of the reel 3 in response to rotation of said reel. It will be noted that the shovel bars 59 are longer than the radius of the cutter blades 55 so that they dig behind earth loosened and cut-up by said blades.

Means for driving the digger reel 3, clockwise, as indicated by the arrow in FIGURE 2 comprises a longitudinal central driven shaft 67 in the upper portion of the housing 1 protectively disposed above the top plate 11 having its ends journalled through front and rear bearings 69, 71 bolted, as at 73, 75 to the front and rear plates 5, 7. A motion transmission shaft 77 of a relatively reduced length is terminally connected by universal joints 79, 81 to the rear power take-off shaft 83 of the tractor 9 and to the front end of the driven shaft 67 at the forward end of the attachment housing, whereby said power take-off shaft 81 is operatively connected to the driven shaft 67. The transmission shaft 77 is telescopic to compensate for vertical adjustment of the housing 1, and the cutter reel 3 by the side power lift arms 19.

A sprocket wheel 85 fast on the rear end of the driven shaft 67 is operatively connected by a sprocket chain 87 to a smaller sprocket wheel 89 fast on the rear reduced end 43 of the cylinder 41 for high speed drive of the cutter reel 3 by the power take-off shaft 83 of the tractor 9.

A pair of rectangular baffle plates 91 extend alongside opposite sides of the housing 1 above the digger reel 3 for deflecting earth and debris dug up by said reel to deflect the earth and/or debris downwardly alongside opposite sides of the ditch 93 being dug, or cleaned out, so that such earth, or debris thrown upwardly and outwardly by the shovel 59 is deflected downwardly at apposite sides of the ditch 93. The baffle plates 91 are hinged, as at 95, to opposite side flanges 97 on the top plate 11 for tilting of said baffle plates upwardly or downwardly to extend at different angles from the housing 1 to obtain the required baffling or deflecting results. Suitable means is provided for the baffle or deflector plates 91 to retain the same in different angularly adjusted positions and which preferably comprises the following. A pair of baffle plate supporting arms 99 are pivoted at one end, as at 101, to lateral lugs 103 on the side arms 23 of the yoke 21 for upward swinging and bolting, as at 105, to lugs, as at 107, on said baffle plates 91 to hold said plates in upwardly and outwardly inclined positions or in downwardly and outwardly inclined positions as shown in full lines in FIGURES 2 and 4, the bolts 105 being insertable in terminal apertures 109 in said arms 99 to bolt said plates in upwardly or downwardly inclined positions.

The operation of the invention will be readily understood from the foregoing and the following. In digging a ditch 93 the housing 1 and digger reel 3 are lowered, from an elevated idle position clear of the ground by the usual operation of the side power lift arms 19, and until the shovel bars 59 start digging into the earth to start a ditch 93 or to clean out such a ditch and the cutter blades 55 cut downwardly into the earth or ground. Then, as the tractor 9 travels forwardly the cutter blades 55 and the shovel bars 59 are still further lowered to cut into and loosen and displace earth. In this connection it is to be emphasized herein that the cutter blades 55 displace and loosen earth, and cut up or loosen debris in advance of the shovel bars 59 which dig out the earth and act in conjunction with the cutter blades 55 to progressively dig a round ditch the depth and width of which may be determined by the extent to which the cutter reel 3 is lowered into the ground. Dug up earth is baffled and deflected downwardly into mounds alongside opposite sides of the ditch 93 if the baffle plates 91 are in downwardly and outwardly inclined positions and thrown outwardly away from the sides of the ditch and the housing 1 by the baffle plates 91 if said plates are adjusted into upwardly and outwardly inclined position. In cleaning out already dug ditches the cutter blades 55 will loosen up stones and cut up weeds, grass and roots in the ditch and the shovel bars 59 will eject the same together with stones and other debris below the cutter blades 55. In cleaning out operations, the shovel bars 59 will throw debris out of the ditch to each side thereof against the baffle plates 91 to be deflected in this same manner as previously described with reference to digging a ditch. Obviously, the housing 1 and cutter reel 3 may be elevated above ground into carrying idle position for transportation from place to place and the housing 1 and cutter reel 3 may be readily detached by removing the bolts 29, 35 while the shaft 77 may be readily detached at the universal joint 79 which is slidably splined, in a manner conventional and not shown, on the power take-off shaft 83. The top plate 11 being concave also acts as a deflector to throw dug up earth and/or debris outwardly of the sides of the housing 1 and ditch 93.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Excavating mechanism for digging ditches or cleaning debris out of the same comprising a housing, an elongated rotary digger reel extending longitudinally of a ditch along a bottom of the housing and including a cylinder journaled in said housing for rotation therein, centrifugally extensible shovel bars on said cylinder revoluble thereby to dig a ditch and throw earth and debris dug out of the ditch outwardly of opposite sides of the housing, means for attaching said housing to a rear power lift of a tractor for raising and lowering of said mechanism into and from ditching position and draft of said mechanism in the line of travel of the tractor to progressively dig a ditch, driven means protectively mounted on said housing operatively connected to said cylinder to rotate the cylinder and means for operatively connecting a rear power take-off shaft of a tractor to said driven means, said drive means being disposed above the cylinder and shovel bars so that the reel may be spaced in close proximity to the tractor and be protected by the housing from the earth thrown by the shovel bars.

2. Excavating mechanism according to claim 1 and a pair of diametrically opposite cutter blades on said cylinder in advance of said shovel bars of semi-circular form and oppositely pitched relatively for cutting into and loosening earth and debris in advance of said shovel bars.

3. Excavating mechanism according to claim 1, and a pair of baffle plates hinged to opposite sides of the housing for vertical adjusting above said reel into different angular positions to variably deflect earth and debris to the ground when thrown outwardly and upwardly by said shovel bars.

4. Excavating mechanism according to claim 1, said shovel bars being pivoted on said cylinder for swinging about axis parallel to that of the cylinder and having curved outer shoveling ends.

5. Excavating mechanism according to claim 4, and a pair of diametrically opposite semi-circular cutter blades on said cylinder in advance of said shovel bars oppositely pitched relatively for cutting into and loosening earth or debris in advance of said shovel bars.

6. Excavating mechanism according to claim 5, said cutter blades being of smaller radius than the length of each of said shovel bars in extended position whereby said shovel bars will dig deeper than the cutting depth of said blades.

7. Excavating mechanism for digging ditches or cleaning out the same comprising a housing, an elongated rotary digger reel extending longitudinally of a ditch along a bottom of the housing and including a cylinder journaled in said housing for rotation therein, extensible shovel bars on said cylinder revoluble thereby to dig a ditch and throw earth and debris dug out of the ditch outwardly of opposite sides of the housing, means for attaching the housing to a tractor for draft of said mechanism thereby, driven means protectively mounted on said housing above the reel and operatively connected to said cylinder to rotate the cylinder and attachable to a power take-off of a tractor to be driven thereby.

8. In combination with a tractor vehicle having a hydraulic hitch mechanism, an excavating attachment comprising, earth deflecting housing means connected rearwardly to said tractor vehicle in close proximity thereto, elongated cylinder means rotatably mounted by the housing means adjacent to the ground, earth loosening cutter means mounted at a forward end of the cylinder means for loosening of earth, spaced shovel blade means movably mounted on said cylinder means rearwardly the cutter means and responsive to rotation of the cylinder means and loosening of the earth by the cutter means to radially extend beyond the cutter means for excavating a ditch, and drive means drivingly connected to the cylinder means and protectively mounted by the housing means above the cylinder means, said drive means being connected to a power take-off on the tractor vehicle.

9. An excavator attachment to a towing vehicle or the like comprising, protective earth directing housing means having an open bottom supported in spaced relation above the ground by the towing vehicle, elongated rotor means rotatably mounted by the housing means, drive means mounted by the housing means in spaced relation thereabove for driving connection to a rear end of the rotor means, universal drive coupling means operatively connected to the drive means at a forward end of the housing means, rigid earth loosening means fixedly mounted on said rotor means extending downwardly out of the open bottom at the forward end of the housing means and longitudinally spaced, extensible excavator means mounted on said rotor means rearwardly spaced from the earth loosening means.

References Cited in the file of this patent

UNITED STATES PATENTS

| | | |
|---|---|---|
| 245,296 | Haughawout | Aug. 9, 1881 |
| 317,809 | Leslie | May 12, 1889 |
| 992,866 | Francis | May 23, 1911 |
| 1,095,097 | Fournet | Apr. 28, 1914 |
| 1,163,643 | Davison | Dec. 14, 1915 |
| 2,364,666 | Seaman | Dec. 12, 1944 |
| 2,552,710 | Dodson | May 15, 1951 |
| 2,940,534 | Chattin | June 14, 1960 |
| 2,957,698 | Martens | Oct. 25, 1960 |

FOREIGN PATENTS

| | | |
|---|---|---|
| 70,242 | Denmark | Nov. 7, 1949 |
| 891,333 | Germany | Sept. 28, 1953 |
| 78,794 | Netherlands | Aug. 15, 1955 |
| 216,979 | Australia | Sept. 4, 1958 |